United States Patent
Wagner

Patent Number: 5,947,652
Date of Patent: Sep. 7, 1999

[54] FACE FRAME DOWEL APPARATUS

[76] Inventor: Fredric P. Wagner, 24941 Calais Pl., Hemet, Calif. 92544

[21] Appl. No.: 09/028,653

[22] Filed: Feb. 24, 1998

[51] Int. Cl.⁶ .............................. B23B 35/00; B23B 49/02
[52] U.S. Cl. ...................... 408/1 R; 408/103; 408/115 R
[58] Field of Search ............................... 408/1 R, 97, 103, 408/115 R, 115 B, 72 B, 241 G, 241 B

[56] References Cited

U.S. PATENT DOCUMENTS

| | | | |
|---|---|---|---|
| 2,602,238 | 7/1952 | Wellman | 408/241 G |
| 2,804,788 | 9/1957 | Humphrey | 408/103 |
| 3,914,871 | 10/1975 | Wolff | 408/103 |
| 4,194,861 | 3/1980 | Keller | 408/115 R |
| 4,834,593 | 5/1989 | Fallon | 408/115 R |

OTHER PUBLICATIONS

Leichtung, Inc. order form for Edge–To–Edge Dowellers.

*Primary Examiner*—Daniel W. Howell
*Attorney, Agent, or Firm*—Stetina Brunda Garred & Brucker

[57] ABSTRACT

A face frame dowel apparatus is disclosed that is accurate, simple to use and easily transported to remote locations. Two positioning blocks are secured parallel to each other and sandwiched about a smaller spacer block in such a manner so as to form a U-shaped channel for receiving work pieces to be dowelled. The spacer block contains one or more sets of dies to guide the drill bit during drilling of pilot holes for dowels. The apparatus is secured to the work piece by pressure asserted by a securing means such as a platen-like device perpendicular to and transversing one of the positioning blocks. Another embodiment of the invention includes a reciprocated guide useful in drilling shelf holes. The guide is attached to the positioning block opposite that containing the securing means, and reciprocated by means of allen screws.

7 Claims, 1 Drawing Sheet

FACE FRAME DOWEL APPARATUS

FIELD OF THE INVENTION

This invention relates to a face frame dowel apparatus, a device useful in the drilling of pilot holes in work pieces designated to receive dowels.

BACKGROUND OF THE INVENTION

It is often desirable to connect work pieces, such as wood, together to form furniture, picture frames, door frames, and the like. Nails, screws, and rope are three methods of connecting work pieces together. However, all three are visible to the naked eye, and hence, are often considered to be aesthetically displeasing. It is even more difficult to connect these work pieces together at corners or face frames where angles are formed. The Most common angles incurred is the right angle or miter joint.

A method of securing such pieces internally is the use of dowels. This is accomplished by drilling corresponding pilot holes of equal size in each of the work pieces, inserting dowels into such holes, and joining the two work pieces together. An adhesive material is often placed in and/or around the dowels and/or on the surface area of each work piece where the same contact each other.

One problem often incurred in the use of dowels is properly spacing the pilot holes with respect to each other and with respect to each work piece. One method of properly spacing the pilot holes is to temporarily locate the same by tapping brads at the dowel positions in the miter face of one work piece, cutting the brads off short and making their impressions on the other face by pressing the two work pieces together, and upon removal of the brads the positions are marked. However, careful drilling is still required to obtain accurate pilot hole positions.

Another problem is properly aligning the two work pieces such that at least one side of the finished product is flush. the difficulty here arises from the fact that the work pieces are typically wood and wood is a substance that does not lend itself to symmetry.

One known device used in drilling pilot holes is a vice-like jig that can be placed over a piece of lumber such that two flaps of the jig extend around the lumber, a centered screw perpendicular to the lumber is used to secure the jig to and about the lumber. the jig has centrally placed guide holes or dies to permit the drilling of the pilot holes. Such holes are automatically centered with respect to the two sides touching the jig, but do not take into account the desire to have surfaces which are flush with one another even though the width of the two pieces of wood being drilled is slightly different.

The doweling of face frames and other work pieces is often done in connection with the assembling of furniture such as desks, book cases, etc. It is often desirable to provide ship shelving for the furniture. Four lines of shelving peg holes are drilled and arranged vertically on the side walls of such furniture. It is difficult to properly align such shelving peg holes with respect to (1) the side walls of the furniture, (2) the other shelving peg holes within that particular row, and (3) the corresponding shelving peg holes located, or to be located, on the other three rows.

Large vices, rulers, T squares, and other instruments of measure and apparatus to hold work pieces have been used in the drilling of pilot holes and the doweling of work pieces. Such apparatus are often large, such as vices which are essentially work-shop bound, or difficult to use, or imprecise in measuring the distances between the pilot holes or the distance the holes are placed from any one of the particular sides of the work piece.

Therefore, it is a feature of the present invention to provide a light weight, portable face frame dowel apparatus.

It is another feature of the present invention to provide an improved face frame dowel apparatus which is useful in the process of connecting work pieces by means of dowels and providing flush alignment of such work pieces on at least one side.

It is yet another feature of the present invention to provide an easily adjustable face frame dowel apparatus capable of receiving work pieces of various widths for the purpose of drilling pilot holes in such work pieces for the receipt of dowels.

It is yet another feature of the present invention to provide a face frame dowel apparatus which is also useful in drilling guide holes in furniture, such as bookcases, capable of receiving slip boards for shelving.

SUMMARY OF THE INVENTION

The embodiments of the present invention disclosed herein are of a face frame dowel apparatus. In a preferred embodiment of the present invention two positioning blocks are sandwiched about a smaller spacer block with all three blocks parallel to each other and held together by two or more cap screws. The blocks are arranged so as to form a U-shape channel on edge such that the apparatus may receive a work piece, an example of which is a one inch by two inch strip of lumber. the spacer block contains two or more dies capable of receiving drill bits for drilling pilot holes, said dies transversing the spacer block and running parallel to the positioning blocks. If the spacer block is square, two sets of dies may be present running perpendicular to each other. The size and thickness of the positioning spacer blocks and the diameter of the dies may be varied as desired usage. The first positioning block includes a means for applying pressure to one side of the work piece when said work piece is in the U-shaped channel. Such pressure means may be a screwable device passing through the perpendicular to said first positioning block and in the portion of the said first positioning block which does not contact the spacer block, i.e., the U-shaped channel, and wherein the surface of said device is platter-like and where the same contacts the work piece it has sufficient diameter and is made of a nonabrasive material so as not to mark said work piece when pressure is applied during placement or due to movement during drilling of the pilot holes. Such pressure is applied by simply screwing down the platter-like device to produce contact with the work piece.

In another embodiment of the present invention, the second positioning block may include an aperture centrally located with respect to that portion of the second positioning block when does not come in contact with the spacer block, said aperture being conically recessed and containing a center line to assist in aligning the apparatus with markings on the work piece. Additionally, the edge of the second positioning block which extends over the material and is the furthest edge of the spacer block may be beveled and include an extension of the center line from the aperture to also assist in alignment of the apparatus with respect to markings on the work piece. Spacer blocks may be interchanged easily by removing the cap screw and exchanging one spacer block for another. The width between the positioning blocks may also be increased by the use of shims, such shims may also be of varying width.

Yet, another embodiment the invention includes is a guide for drilling shelving pilot holes. Such guide may take the form of any elongated block reciprocated from the positioning block by two allen screws. Said guide may contain a series of dies for drilling shelving peg holes inside of the work piece. When four or more such die holes are provided, consistent alignment can be further assured by matching two die holes with the previous drill holes and by moving the apparatus up and down on the work piece, thus permitting the drilling of a straight line of shelving pilot holes which are equal distance from each other.

BRIEF DESCRIPTION OF THE DRAWINGS

So that the manner in the above-recited features, advantages and objects of the invention, as well as others which will become apparent are obtained and can be understood in detail, more particular description of the invention briefly summarized above may be had by reference to the embodiments thereof, which are illustrated in the drawings, which drawings form a part of this specification. It is to be noted, however, that the appended drawings illustrate only typical embodiments of the invention and therefore are not to be considered limiting of scope, for the invention may admit to other equally effective embodiments.

DETAILED DESCRIPTION OF THE PREFERRED EMBODIMENT

The face frame dowel apparatus described hereinafter is portable, easy to use and provides for flush contact on one side of dowel-connected work pieces, even such work pieces are of slightly different thicknesses, which is often the case with lumber.

Figure 1:
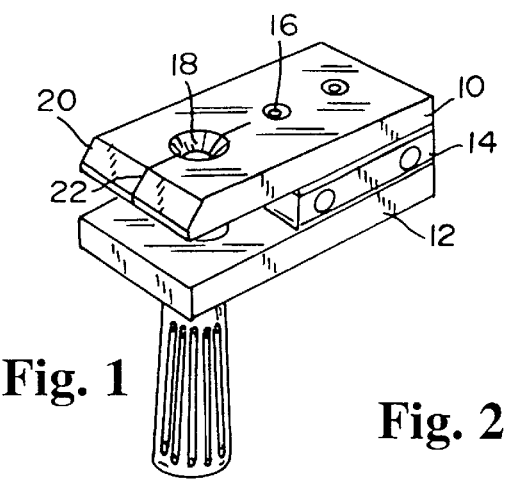
FIG. 1 is an oblique pictorial view illustrating a face frame dowel apparatus in accordance with the present invention.

Now referring to the drawings, and first in FIG. 1, a face frame dowel apparatus of the present invention is illustrated. Two positioning blocks, 10 and 12, are sandwiched about a smaller spacer block 14. Two cap screws, 16 connect the two positioning blocks 10, 12 and spacer block 14 together. The positioning and spacer blocks 10, 12, 14 form a U-shaped channel to receive a work piece, such as lumber, into which pilot holes are to be drilled for doweling purposes.

Also illustrated in FIG. 1, positioning block 10 includes a conical shaped aperture 18 and a beveled edge 20 on that portion of the positioning block 10 which is not in contact with spacer block 14. A hair or alignment line 22, passes through the aperture 18 perpendicular to the beveled edge 20 of the positioning block 10. The aperture 18 and beveled edge 20 permit three contact points for the hair line 22 with respect to alignment markings on the work piece 46. A variety of known methods of marking and measuring the work piece may be used. Since the purpose of using dowels is to join two work pieces together, the work pieces may be properly marked and then aligned using the hair line 22 so as to cause each separate work piece to be marked and aligned in the corresponding spot with respect to said other work piece.

Figure 2:
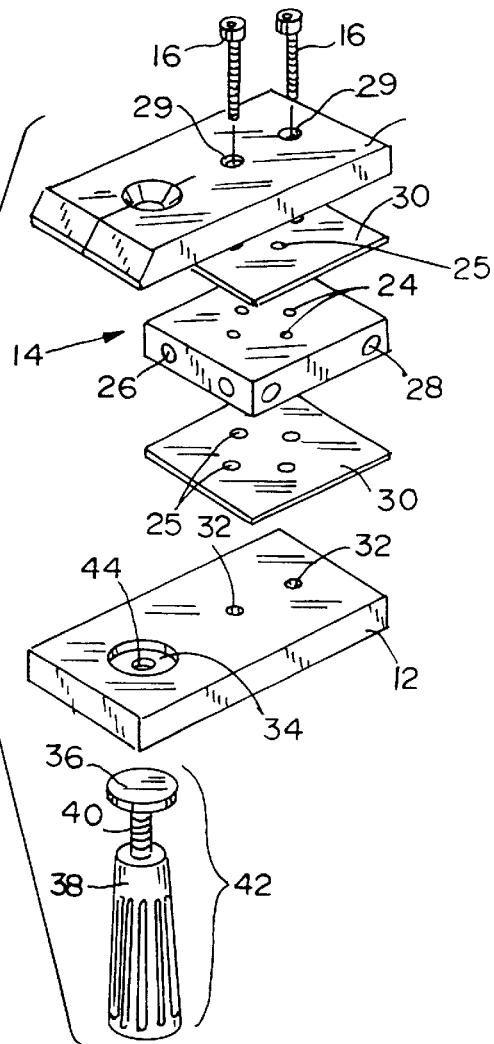
FIG. 2 is an exploded pictorial view of the face frame dowel apparatus in FIG. 1, except that disc 36 of platen 2 is on the inside of positioning block 12 when the apparatus is assembled.

Turning attention to FIG. 2, an exploded pictorial illustration of a face frame dowel apparatus is provided. The spacer block 14 is shown with four apertures 24, which permit the cap screws 16, to pass through said spacer block 14. These four apertures 24 form a square thus permitting the spacer block 14 to be rotated 90 degrees within the sandwich, while requiring only two cap screws 16 to secure the same with respect to the positioning blocks 10, 12.

Perpendicular to the cap screw apertures are two pilot holes 26 which transverse the spacer block 14. The spacer block 14 should be of a size that when a drill bit is attached to the drill, said bit will pass through the spacer block 14 and extend a sufficient distance therefrom so as to create the desired penetration in the work piece to produce appropriate pilot holes during the drilling procedure. The spacer block 14 is preferably square thus permitting a second set of two pilot holes 28 to traverse the spacer block 14 perpendicular to the first set of pilot holes 26. This second set of pilot holes 28 may be of a different diameter than the first set of holes 26. The spacer block 14 is readily removed by first removing the cap screws 16. Spacer blocks of various widths and/or containing various diameter pilot holes may be easily interchanged and the length of the cap screws 16 may also be changed to accommodate such variations.

The width of the spacer block 14 may be further increased by one or more shims 30. Each of the shims 30 is provided with four apertures 25 therein which are arranged in a pattern identical to the pattern of the apertures 24 within the spacer block 14. As such, when the shim(s) 30 are properly abutted against either or both of the opposed faces of the spacer block 14, the apertures 25 of each set are coaxially aligned with respective ones of the apertures 24. The length and width dimensions of each generally square shim 30 are preferably equal to the length and width dimensions of the generally square spacer block 14 such that the peripheral edges of the shim(s) 30 and spacer block 14 are substantially flush with each other when the apertures 25 of each set are coaxially aligned with the apertures 24. The thickness or width of these shims 30 may also be varied as desired. To secure the spacer block 14, shim(s) 30 and positioning blocks 10, 12 to each other, the top positioning block 10 is provided with a pair of apertures 29 extending therethrough, with the bottom positioning block 12 including a pair of internally threaded apertures 30 disposed therein. As will be recognized, the apertures 29, 30 are coaxially alignable with respective pairs of the apertures 24, 25 disposed within the shim(s) 30 and spacer block 14. The advancement of the cap screws 16 through the apertures 29, 24, 25 (if one or more shims 30 is included) and into the internally threaded apertures 32 completes the attachment of the positioning blocks 10, 12, spacer block 14, and shim(s) 30 (if included) to each other.

A platen device 42 is used to supply pressure on the work piece after such work piece is placed in the U-shaped channel formed by the positioning and spacer blocks 10, 12, 14. The device 42 is comprised of three parts, a disc 36, an arm 38, and a threaded cylinder 40 connecting the disc 36 and arm 38. The platen-like device 42 penetrates positioning block 12 with the disc 36 being internal with respect to the channel and the arm 38 being external thereto. The platen-like device 42 may be reciprocated into the out of disc-shaped recess 34 found in positioning block 12. Such reciprocation is accomplished simply by turning arm 38, thereby turning the threaded cylinder 40 in the threaded aperture 44. By tightening arm 38, disc 36 is projected into the channel and against the work piece when same is positioned therein. The pressure applied by the disc 36 to the work piece causes the work piece to be pressed against positioning block 10, thus preparing and holding the work piece in a stable manner for drilling purposes.

It should be appreciated that by applying pressure to one side of the work piece and causing such work piece to contact the inner surface of the positioning block 10 in a consistent manner each time, the distance from the inner surface of positioning block 10 to the axes of the apertures produced by drilling through the holes 26, 28 in spacer block 14 will consistently be equal. Hence, when two work pieces have been drilled, coaxially aligning the drilling produced apertures will result in those sides of the two work pieces that were contacting positioning block 10 being substantially flush with respect to each other even though the width or thickness of each of the work pieces may not be exactly the same.

Figure 3:
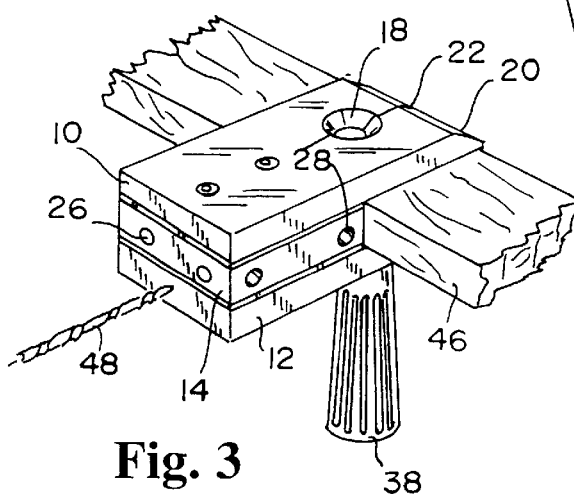
FIG. 3 is a mirror image pictorial view of the face frame dowel apparatus of FIG. 1 illustrating the procedure for drilling pilot holes in a piece of wood.

FIG. 3 illustrates the face frame dowel apparatus attached to a work piece 46. The work piece 46 rests in the channel made by the two positioning blocks 10, 12 sandwiched about the spacer block 14, including shims 30 where desired. The face frame dowel apparatus is secured to the work piece 46 by tightening the platen-like device 42 thereby putting pressure on one side of the work piece 46. A drill bit 48 is shown entering pilot hole 26. The holes 26, 28 may each be defined by a die which preferably is made of a strong material such as a hardened steel insert or a bushing insert and is pressed into the spacer blank 14 to resist abrasion from the drill bit. The holes 26, 28 act as a channel for the drill bit 48 until it contacts the work piece 46. The drill bit 48 penetrates the work piece 46 creating a pilot hole which in turn receives the dowel.

Two pilot holes are commonly drilled in each work piece since this will prevent the two work pieces, when joined to each other, from twisting. An adhesive material, such as wood glue, is commonly applied to the dowels, pilot holes, and/or surfaces where the two pieces contact each other.

Another embodiment of the present invention includes a guide for drilling shelf peg holes. The doweling of work pieces for assembly purposes in the furniture business is very popular. It is often desirable to use this method of joining work pieces in connection with the production of bookcases, credenzas, computer stands, and the like. It is also often desirable to include adjustable shelves in these pieces of furniture. One popular design to accomplish this end uses two parallel rows of guide holes running up and down each side of the furniture. Four small pegs are then placed in the corresponding holes in each row and the shelving is placed on that portion of the pegs that extends outward from such peg holes on the sides of the piece of furniture.

Figure 4:
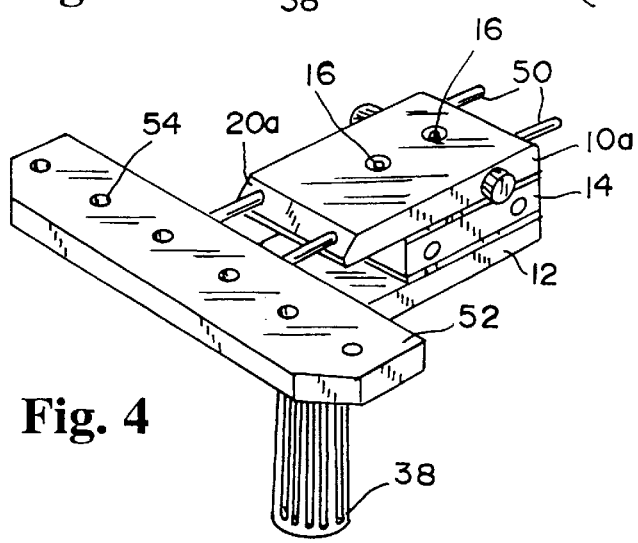
FIG. 4 is a pictorial view of another embodiment of the face frame dowel apparatus which includes a guide useful in the drilling of pilot holes.

FIG. 4 illustrates a guide 52 which may be slidably attached to a positioning block 10a which is substantially similar to the previously described positioning block 10, but further includes a first pair of apertures which extend longitudinally therethrough to the beveled edge 20a thereof, and a second pair of apertures which extend laterally therein and communicate with respective ones of the longitudinal apertures. The longitudinal apertures are sized and configured to slidably receive respective ones of a pair of attachment rods 50 which extend from a common edge of the guide 52. The laterally extending apertures are adapted to threadably receive respective ones of a pair of locking knobs 51. As will be recognized, the tightening of the locking knobs 51 causes compressive pressure to be exerted thereby against the attachment rods 50, thus effectively maintaining the attachment rods 50 in a desired position within the longitudinal apertures of the positioning block 10a, and hence maintaining the guide 52 in a desired orientation relative to the positioning block 10a.

Disposed within the guide 52 are a plurality of linearly aligned apertures 54 which extend longitudinally along the approximate center of the guide 52 in equidistantly spaced relation to each other. These apertures 54 may also be defined by hardened steel inserts or bushings to protect the rest of the guide 52 during drilling. The face frame dowel apparatus when attached to the work piece in the same manner as described above, acts as a drill guide for shelving peg holes. By moving the guide 52 so as to overlap the last two previously drilled shelving peg holes, the two previously drilled die holes act to properly adjust the placement of guide 52 to assure the precise placement of the next shelving peg holes. Thus, a consistently straight line of die holes for drilling purposes is maintained.

While particular embodiments of the invention are described, it should be understood that the invention is not limited thereto, since many modifications will be apparent to those skilled in the art and may be made without parting from the spirit and scope hereof. An example of such modification is the use of a hexagon spacer block instead of a square spacer block permitting additional sized die holes to be included therein.

What is claimed is:

1. A face frame dowel apparatus comprising:
   a first positioning block;
   a second positioning block;
   a spacer block having at least two generally parallel pilot holes extending therethrough;
   at least one fastener securing said spacer block between said first and second positioning blocks such that the positioning blocks and the spacer block collectively define a U-shaped channel for receiving a work piece, and such that the pilot holes extend in generally parallel relation to said positioning blocks and in generally perpendicular relation to said channel; and
   means for securing said work piece in said channel.

2. A face frame dowel apparatus in accordance with claim 1 wherein said securing means is a platen device attached to said second positioning block, said platen device defining a flat end which is reciprocally movable into and away from said channel.

3. A face frame dowel apparatus in accordance with claim 2 wherein said platen device includes an arm having a disc attached thereto which defines the flat end, said disc being attached to said arm in a manner wherein said disc does not twist during reciprocation.

4. A face frame dowel apparatus in accordance with claim 1, wherein said first positioning block includes a conical aperture, a beveled edge, and an alignment line perpendicular to said beveled edge and passing through said aperture.

5. A face frame dowel apparatus in accordance with claim 1, including an elongate guide movably attached to said first positioning block and having a plurality of apertures disposed therein.

6. A method of making holes for dowels and work pieces comprising the steps of:
   (a) providing a face frame dowel apparatus having first and second positioning blocks and a spacer block which are attached to each other in a manner collectively defining a generally U-shaped channel, a means for securing a work piece placed in the channel against the first positioning block, and at least two pilot holes extending through the spacer block in generally parallel relation to the first and second positioning blocks and in generally perpendicular relation to said channel;

(b) placing a work piece in said channel;

(c) securing said work piece against said first positioning block via said securing means; and (d) drilling pilot holes in said work piece with a drill via the pilot holes in said spacer block.

7. The method of claim 6 wherein step (c) comprises securing the work piece in said channel through the use of a platen device which is attached to said second positioning block and defines a flat end which is reciprocally moveable into and out of said channel.

* * * * *